No. 704,867. Patented July 15, 1902.
J. N. DEWS.
PILL MAKING MACHINE.
(Application filed Dec. 7, 1901.)
(No Model.)
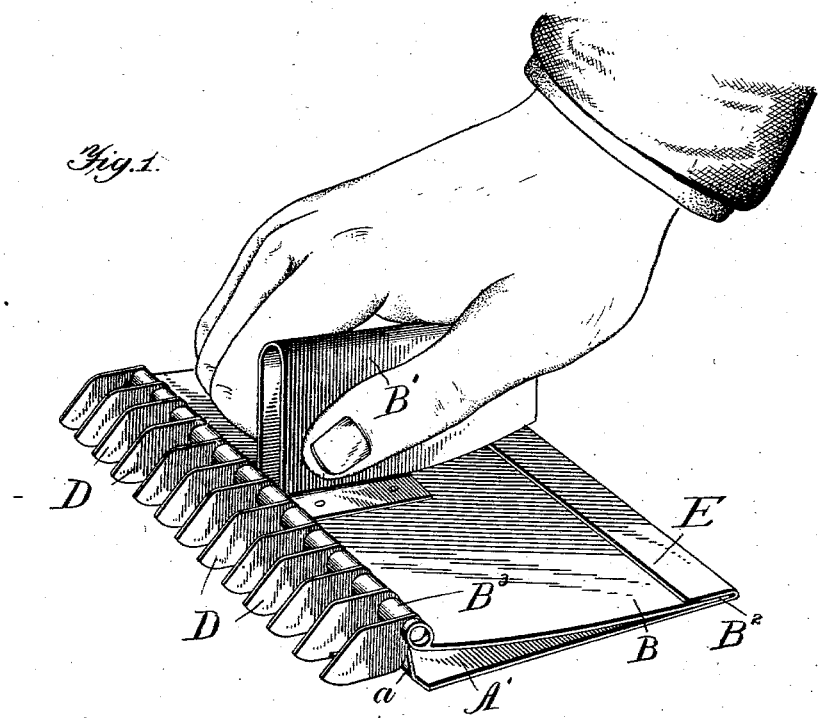
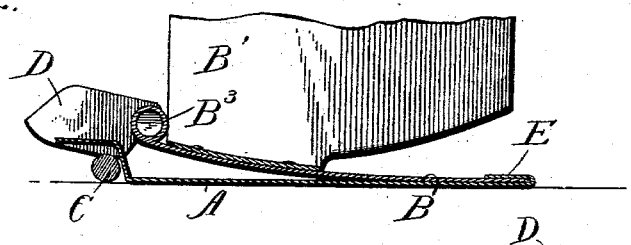
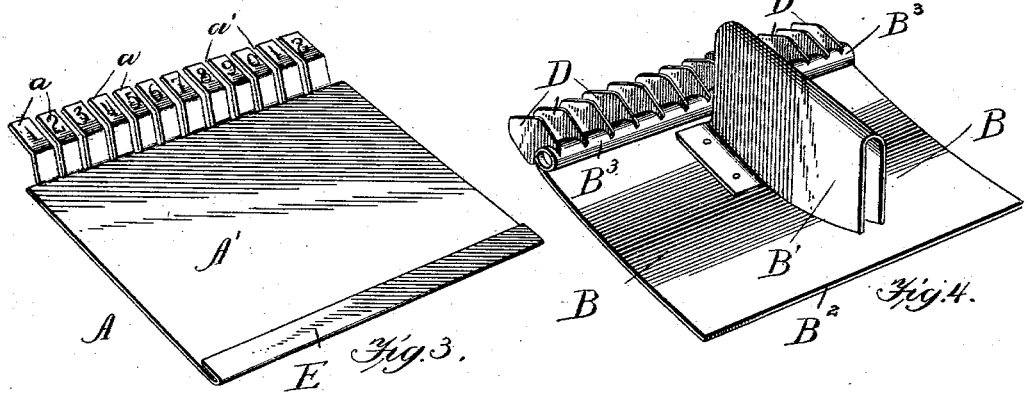
WITNESSES:
Geo. P. Kingsbury
Perry B. Turpin
INVENTOR
Julius N. Dews.
BY Munn & Co.
ATTORNEYS
THE NORRIS PETERS CO., PHOTO-LITHO., WASHINGTON, D. C.

UNITED STATES PATENT OFFICE.

JULIUS N. DEWS, OF PORTSMOUTH, VIRGINIA.

PILL-MAKING MACHINE.

SPECIFICATION forming part of Letters Patent No. 704,867, dated July 15, 1902.

Application filed December 7, 1901. Serial No. 85,011. (No model.)

*To all whom it may concern:*

Be it known that I, JULIUS N. DEWS, a citizen of the United States, and a resident of Portsmouth, in the county of Norfolk and State of Virginia, have made certain new and useful Improvements in Pill-Making Machines, of which the following is a specification.

My invention is an improvement in machines for making pills, and has for an object to provide a simple novel construction by which the roll of material may be cut into the desired number of sections to provide the number of pills prescribed in any instance; and the invention consists in certain novel constructions and combinations of parts, as will be hereinafter described and claimed.

In the drawings, Figure 1 is a perspective view of my improved machine as in use. Fig. 2 is a cross-sectional view thereof. Fig. 3 is a detail perspective view of the base-section, and Fig. 4 is a detail perspective view of the cutter-section.

The device, as shown, consists of the base-section A and the cutter-section B, which are radially detachable when connected, as shown in Fig. 2. The base-section A is provided at one edge of its plate A' with the tongues or strips $a$, which extend upwardly and then forwardly, so the roll C of material may fit beneath the said tongues, as shown in Fig. 2. The tongues are of equal width and are spaced apart at $a'$ to permit the play of the knives D of the cutter-section B, and these tongues are preferably numbered from 1 to 12, as shown in Fig. 3, for convenience in applying the machine to the roll of material for cutting the desired number of pills from said roll, as will be understood by those skilled in the art. At its edge opposite the tongues $a$ the plate A' is provided with a returned strip or portion E, which forms a keeper for the rear edge of the plate B, as shown in Figs. 1 and 2. The plate B has a handle B', is fitted at its rear edge $b^2$ to be held in the keeper E, so it can be readily applied to and detached from the base-plate A', and said plate B is provided at its front edge with the roll $B^3$, from which project the cutters D, and is curved upwardly from its edge $B^2$ toward the said cutters, so it will normally occupy the position shown in Fig. 2, with the cutters elevated, so they will overlie the roll C, placed beneath the tongues $a$, as shown in Fig. 2.

It is preferred to make both sections A and B of spring material, so that the cutter-section will normally stand in the position shown in Figs. 1 and 2 and will return to such position when released after being depressed to cut the mass into sections. It will be noticed the sections A and B are readily fitted together and detached, so they can be thoroughly cleansed after each operation.

While the spring of the sections is usually sufficient to throw the section B to the position shown in Fig. 2, it will be noticed the handle B' is so formed as to operate as a lever and force the cutter-section to the position shown in said figure. This is effected by elongating the handle B' in the direction of the blades D, securing it at its end adjacent to said blades to the plate B, and having its lower edge at its opposite end separated from and spaced apart from the plate B, so the handle will readily operate as a lever in forcing the cutter-blades to the position shown in Figs. 1 and 2.

It will be noticed from Figs. 1, 2, and 4 that the machine as a whole, as shown in Figs. 1 and 2, or the section B alone may be used to roll the mass into a roll, as shown in Fig. 2, and then divide it into equal parts. The invention will not only facilitate the division of the roll accurately into equal parts, but will enable this result being secured with great accuracy.

Having thus described my invention, what I claim as new, and desire to secure by Letters Patent, is—

1. The pill-making machine herein described consisting of the base-section composed of a plate provided at its front edge with tongues spaced apart for the cutters and at its rear edge with a returned portion forming a keeper and the cutter-section having its rear edge fitted detachably in the keeper of the base-plate and its front edge normally sprung apart from the base-plate and provided with blades operating between the tongues of the said base-plate substantially as set forth.

2. The combination in a pill-making machine of the base-section provided at its rear edge with a forwardly-opening keeper and the cutter-section fitted at its rear edge detachably in said keeper and provided at its front edge with blades for dividing the mass into sections substantially as set forth.

3. A pill-making machine comprising the base, the cutter-section held at its rear edge to the base and provided at its front edge with blades and sprung at its front edge normally away from the base and the handle secured at its front end to the cutter-section and elongated in the direction of the blades, and free at its rear end from the cutter-section whereby the said handle may operate with a lever action, substantially as set forth.

4. A pill-making machine consisting of the base provided at its front edge with a spaced-apart tongue and the cutter-section held at its rear edge to the base and provided with a transverse roll and with blades projecting therefrom at the front edge of the cutter-section substantially as set forth.

5. A pill-making machine consisting of the base-plate having a returned rear edge forming a keeper and provided at its front edge with the upwardly and forwardly projecting tongues spaced apart and the cutter-section fitting at its rear edge detachably in the keeper formed by the returned edge of the base-section and provided at its front edge with blades operating between the tongues of the base-section substantially as set forth.

6. A pill-making machine comprising a base-section and a cutter-section held together at their rear edges and sprung apart at their opposite edges and a handle secured at its front end to the cutter-section and having a rearward extension whereby it may operate with a lever action substantially as set forth.

7. A pill-making machine consisting of base and cutter sections, one of said sections being provided at its rear edge with a forwardly-opening keeper for receiving the rear edge of the other section substantially as set forth.

JULIUS N. DEWS.

Witnesses:
JAMES B. MAUPIN,
SAM WATTS.